United States Patent [19]
MacLennan et al.

[11] Patent Number: 5,422,553
[45] Date of Patent: Jun. 6, 1995

[54] SERVO ACTUATOR DIAGNOSTIC MONITORING

[75] Inventors: Roderick MacLennan, Stratford; Karl H. Wallischeck, Fairfield, both of Conn.

[73] Assignee: United Technologies Corporation, Hartford, Conn.

[21] Appl. No.: 678,135

[22] Filed: Dec. 4, 1984

[51] Int. Cl.⁶ ............................................. G05B 23/02
[52] U.S. Cl. .................................................. 318/565
[58] Field of Search ......................................... 318/565

[56] References Cited
U.S. PATENT DOCUMENTS 4,191,913 3/1980 Arnold et al. ................. 318/565 X
4,266,170 5/1981 Inoue ................................. 318/565
4,305,028 12/1981 Kostas et al. ..................... 318/565
4,375,611 3/1983 Greig ................................. 318/565
4,471,279 9/1984 Inaba et al. ....................... 318/565

Primary Examiner—Theodore M. Blum
Attorney, Agent, or Firm—Robert E. Greenstien

[57] ABSTRACT

The output response of a pilot valve controlled servo 10 is monitored by a computer 20 using a transducer 16 on the main control valve 12 and a transducer 11 on the servo output 10a. The response is compared by determining the predicted output response and response time from a mathematical model for the servo, and if the response or response time is incorrect, a warning indication is provided.

3 Claims, 3 Drawing Sheets

SERVO ACTUATOR DIAGNOSTIC MONITORING

TECHNICAL FIELD

This invention pertains to servo actuators, in particular, real time diagnostic monitoring of servo actuator operation.

BACKGROUND ART

Servo actuators, which are hydraulically-powered driving devices, are very widely used. In some applications satisfactory performance is especially critical. For example, in helicopters, rotor position is controlled by two parallel servos, because that way gradual wear on the internal seals and other components in one actuator does not affect control characteristics and reliability. The redundancy also means, however, that gradual wear on one of the servos may go undetected: satisfactory operation of one servo "masks" the weakness of the other. The prospect of this "occult" servo degradation has been expensively addressed by disassembling the servo at periodic intervals and replacing worn-out parts, which also places the helicopter out-of-service for a period of time. A better approach to this problem is needed.

DISCLOSURE OF INVENTION

According to the present invention, during actual servo operation the predicted actuator response to an input command is compared with the actual response for that command. If the difference between actual and predicted characteristic exceeds acceptable stored parameter levels, a warning is provided. Real time servo diagnosis is performed in this manner. In a helicopter, for example, it may be done during actual flight, with the warning given to the pilot or automatically noted, perhaps in a flight data recorder.

A feature of "real time diagnostics" according to the present invention is that the servo actuator is monitored continuously during actual operation and an early warning is given when the performance is below acceptable levels.

Another feature of the present invention is the ability to detect, during actual flight, the extremely small, perhaps occult, changes in actuator performance that are early indications of part degradation operation.

The present invention may be used in other applications, like helicopters and aircraft, in which it is desirable to monitor the actual operating characteristics between input and output of a hydraulic servo device or, for that matter, even a pneumatic servo device. Other objects, benefits and features of the present invention will be apparent to one skilled in the art from the following.

BEST MODE FOR CARRYING OUT THE INVENTION

Figure 1:
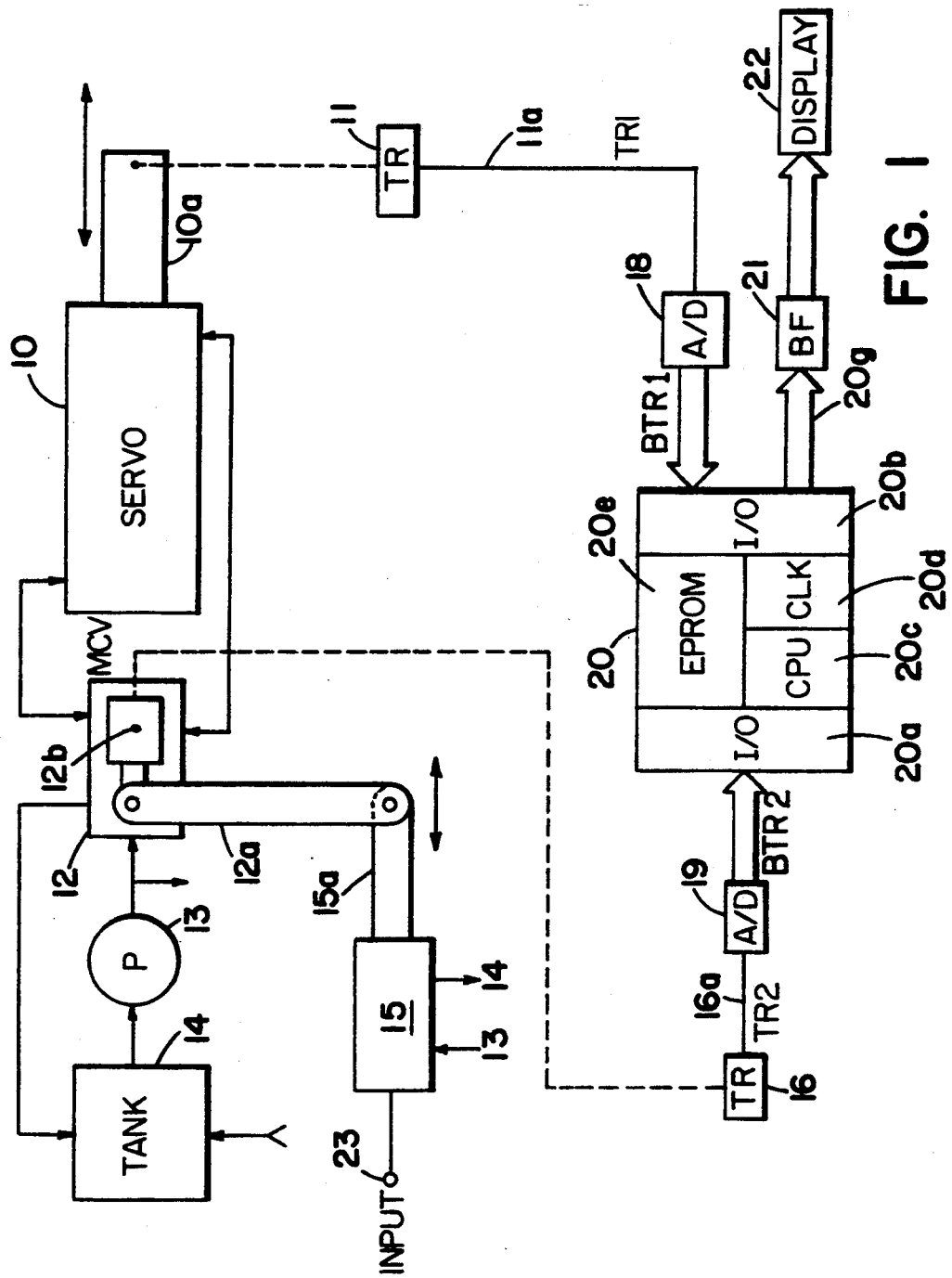
FIG. 1 is a simplified block diagram that shows a servo system comprising a pilot valve controlled servo and a servo monitoring system according to the present invention.

The servo system shown in FIG. 1 includes a servo actuator 10 that has an output plunger 10a which moves back and forth in the direction shown by the arrow to control the position of an object, such as an aircraft control surface in a fixed wing or rotary wing aircraft. An electromechanical transducer 11 (known in the art) is connected to this plunger 10a for detecting the linear motion thereof and providing an analog output signal TR1 on the line 11a. The operation of the servo 10 is controlled by a main control valve, (MC) valve 12, which has a control arm or lever 12a which, to control the position of the plunger 10a, is moved back and forth in the direction shown by the arrow for controlling fluid flow, according to known techniques, between opposite sections or sides of the servo 10 from a pump 13 and a fluid supply tank 14. The MC valve 12 controls both high pressure and low pressure flow between the tank and the servo 10, and, as is well known, depending upon the change in position of the arm from its neutral position, the plunger 10a position is controlled. The arm 12a on the MC valve (12) may be controlled by the output plunger from a smaller, low power servo mechanism 15, which can be a separate unit or part of servo 10. An input 23 may be linked directly to the pilot controls for controlling the operation of the servo 10. A plunger 15a on the servo 15 moves back and forth in the direction of the arrow, thereby controlling the flow through the MC valve 12. The low power servo (if used) is also connected to the tank 14 and the pump 13. The control arm 12 moves back and forth in the direction shown by the arrow adjacent thereto, causing the main control valve spool 12b to move corresponding to the flight path commands on input 23, and this motion is detected by a second transducer 16 which produces an output TR2 on the line 16a. The magnitude of that output, like the magnitude of the output TR1 (on the line 11a) manifests the change in position of the device connected thereto. The TR1 and TR2 signals are supplied to corresponding A/D converters 18 and 19 which convert the analog TR1 and TR2 signals into binary equivalents, the BTR1 and BTR2 signals which are furnished to the I/O (input/output) ports 20a, 20b of a computer 20. The computer also includes a CPU (central processing unit or microprocessor) 20a, a clock 20d and an EPROM 20e, which stores certain programs associated with the operation of the processor 20c. These components, and the operation of a computer are, of course, well known. Numerous technical publications are available on that subject, and a detailed explanation of the operation of the computer consequently is not necessary for an understanding of the invention herein. The invention will be described in the context with a program of instructions that may be used to program any form of computer of well known types and implement the diagnostic routines needed to carry out the present invention. The invention resides not in the particular apparatus for carrying out the program (or programs), but a servo system which, as a whole, operates in a manner characterized by the operation resulting from the use of the program with a servo.

Using the signals BTR1 and BTR2 and the internally generated clock signals (from the clock 20d), the computer 20 determines the correct operation of the servo with respect to its transfer function (e.g., FIG. 3), and, if the operation is below an accepted level (as demonstrated in the flow chart of FIG. 2), an output signal is generated on the output line 20g to cause a buffer 21 to operate or activate a display 22. This display may be a visual or aural warning, and depending upon the selection of the signal outputted to the buffer 21 by the computer, the signal may even identify the servo or the type of operating characteristic. Such operations may be done by suitably programming the computer once the diagnostic routines hereinafter described are accomplished, by which the incorrect operation of the servo, with respect to its predicted operation, is determined. The predicted, or idealized, output response for the servo may be determined by using a transfer function to arrive at a "real time" output computation, or the EPROM may contain a large lookup table listing input and corresponding output responses of the servo that are determined in advance using the transfer function. The latter technique is incorporated in this discussion, mainly because it generally leads to faster monitoring.

Figure 2:
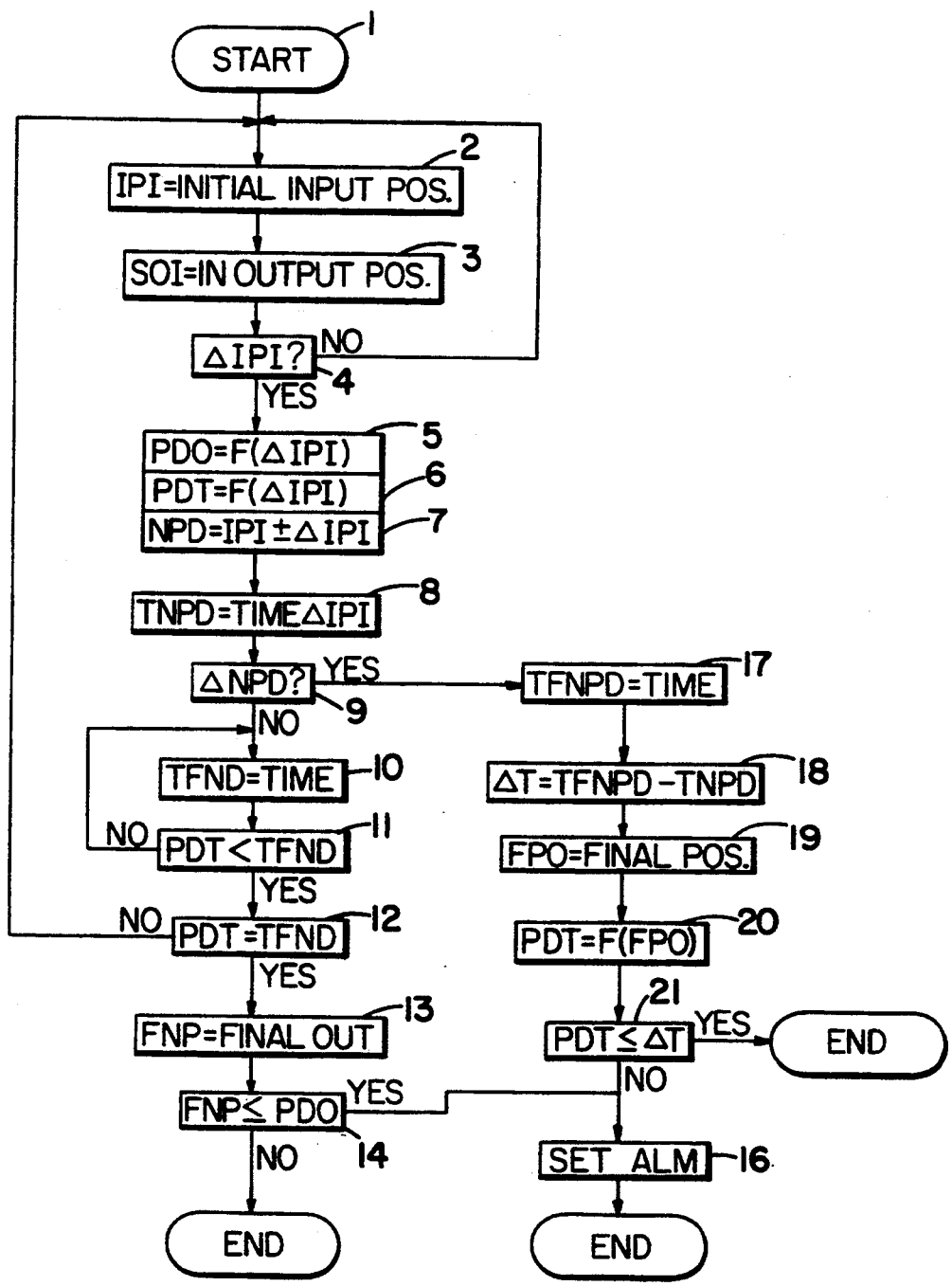
FIG. 2 is a flowchart that shows a diagnostic routine, embodying the present invention, by which the actual and predicted output characteristics of a servo actuator in the system shown in FIG. 1 are determined by the servo monitoring system.
Figure 3:
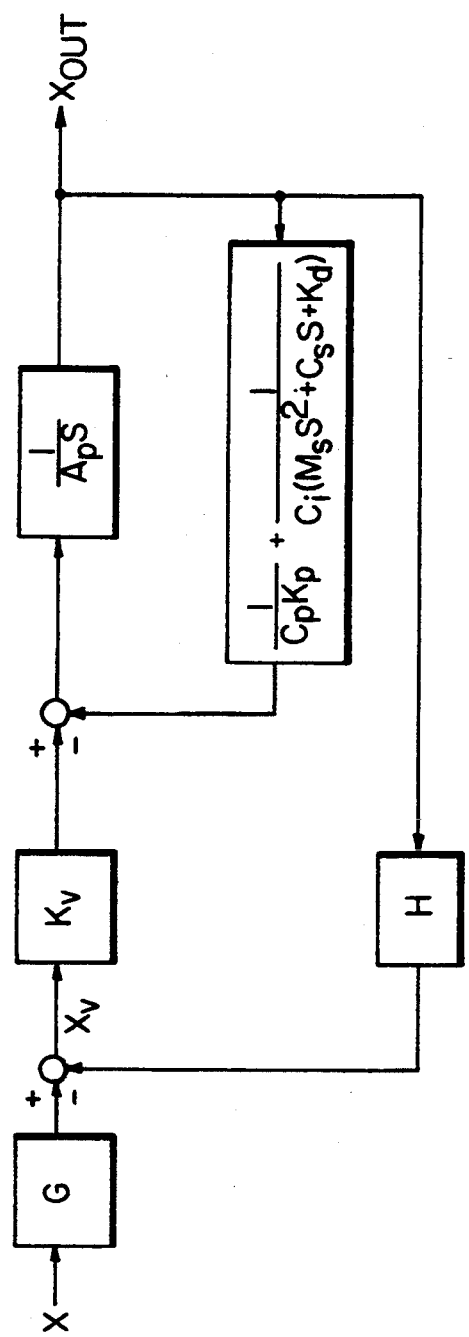
FIG. 3 is an experimentally determined transfer function that may be used, with the servo monitoring system, to determine the output response for the servo system in FIG. 1.

Referring now to the flow chart in FIG. 2, the diagnostic routine starts at the initialization step 1, then proceeds to step 2, in which the initial position (IPI) of the MC valve is determined from the BTR2 signal. In step 3, the initial servo output position (SOI) of the piston 10a is determined from the BTR1 signal. In step 4 a test is made to determine whether there has been any change in the initial position of the arm 15a. If the answer is negative, the routine returns to step 2, but a positive result in the step 4 shows that there has been a change in the position of the MC valve; then the routine proceeds to step 5, in which the predicted output (PDO) for the change in position is determined, preferably by searching the EPROM for an output addressed by the changed IPI signal. In the next step 6 the predicted time (PDT) for the output of the servo to respond in response to the change in IPI is determined, also by using the lookup table. In step 7, the new position of the plunger is determined by summing (adding or subtracting) the change and the initial position. In step 8, the time is noted at which the change occurred, and then a test is made, in step 9, to determine if there has been a subsequent change in the position of the MC valve since step 4. If the answer is negative, the routine proceeds to step 10 in which the current time is noted, and in step 11 a comparison is made to determine whether the actual time is greater than the predicted time. If it is not, the routine returns to step 10. The consequence of this particular approach is that the test waits until the predicted time has elapsed, that being the maximum permissible time permissible according to the theoretical model for the output of the servo to respond. Once the actual time is no longer less than the predicted time, a test is made at step 12 to determine if the predicted time equals the then current time. If the result is negative, the process returns to step 2, to once again start testing the servo, beginning with the "new" initial position. If the answer is in the affirmative in step 12, the final output position is noted in step 13 and a comparison is made, in step 14, to determine if the final output is less than the predicted output. If the answer is negative, then the performance is satisfactory and the test procedure ends. If however the answer is affirmative, there is an error, and in step 16 an alarm signal is set. That signal is provided to the buffer 21 (in FIG. 2) which activates the display in an alarm warning system. Then the diagnostic procedure ends.

This process has determined whether the actual mechanical movement (or displacement) of the servo plunger 10a is within the predicted movement by using stored performance characteristics for the servo for preset changes in initial position of the MC valve. But, at step 9, it was possible to have an affirmative result. It is possible that during the process the MC valve would again be moved; that would show up in test 9, because then there would be a change in the new position. In response to the affirmative result in test 9, the procedure goes to step 17, at which the time is noted for the change in the position of the MC valve. The elapsed time between the initial position and the time when the MC valve has again moved is determined in step 18, and in step 19 the final position for the servo is noted. Then in step 20 the predicted time for that final position is determined, and, as before, this may be done by using a lookup table in the EPROM or by computing the position based upon the transfer function. In step 21, a test is made to determine whether the predicted time is less than or equal to the elapsed time. If it is less than or equal to it, the servo response characteristic (with respect to time) is satisfactory. If the result is negative, the alarm is set at step 16. If the result is positive then the procedure ends. This test routine has determined whether the output performance for the servo for a given MCV displacement is satisfactory based upon the theoretical performance characteristics of the servo. If, however, there is a change in the MC valve motion (which in all likelihood will occur in an aircraft), the performance is determined with respect to the achieved position for the time up until there was a change in the MC valve position.

The foregoing is a description of the preferred embodiment of the present invention. Using this description, one skilled in the art may develop modifications and variations to the described embodiment of the invention without departing from its true scope and spirit.

We claim:

1. A servo system comprising:
   a fluid tank;
   a pump;
   a hydraulic actuator with an output piston;
   a flow control valve that has a flow control element movable through a range of positions for controlling the fluid flow to the actuator to move the piston through a range of positions of the piston by sensing the change in piston position in response to the movement of the flow control element;
   a pump for supplying fluid to the valve from the fluid tank;
   the servo system being characterized by:
   a first position transducer coupled to the flow control valve for providing a first signal manifesting a change in the position of the flow control element;
   a second position transducer coupled to the piston for providing a second signal that manifests a change in the position of the piston;
   processing means that is responsive to the first and second signals for providing, during movement of the flow control element, a computed second signal at the time the first signal is provided that represents what the second signal should be for the first signal, for providing a difference signal manifesting that there is a difference between the computed signal and the second signal, and for providing a warning signal in response to the difference signal to operate a display device; and a display operated by the warning signal.

2. A system according to claim 1, characterized in that:

said processing means comprises means for providing a predicted output signal which manifests a predicted output for a change in the servo input, for providing a predicted time signal which represents a predicted response time for the servo output for the input change, for providing an elapsed time signal manifesting the elapsed time since the occurence of the input change and a response time error signal manifesting that the elapsed time equals the predicted time and the output is not the predicted output manifested by the predicted output signal.

3. A servo according to claims 2 or 1, characterized in that said processing means comprises means for providing an interval time signal indicating the interval of time until a change in the input from the time at which the first time signal is produced, for providing an interval output signal manifesting a predicted output for the servo in the interval of time manifested by the second time signal and providing an interval error signal if the servo output is not the output manifested by the interval output signal.

* * * * *